United States Patent [19]

Arai et al.

[11] Patent Number: 4,495,242
[45] Date of Patent: Jan. 22, 1985

[54] MAGNETIC RECORDING MEDIUM

[75] Inventors: Yoshihiro Arai; Akira Nahara, both of Kanagawa, Japan

[73] Assignee: Fuji Photo Film Co., Ltd., Kanagawa, Japan

[21] Appl. No.: 364,271

[22] Filed: Apr. 1, 1982

[30] Foreign Application Priority Data

Apr. 2, 1981 [JP] Japan ................................ 56-49883
Apr. 2, 1981 [JP] Japan ................................ 56-49885
Apr. 2, 1981 [JP] Japan ................................ 56-49886

[51] Int. Cl.³ .............................................. B05D 5/12
[52] U.S. Cl. ..................................... 428/336; 427/39; 428/693; 428/695; 428/900
[58] Field of Search .............. 428/695, 900, 336, 693; 427/127-132, 48, 39

[56] References Cited

U.S. PATENT DOCUMENTS 3,892,888  7/1975  Halaby et al. ....................... 427/127
4,171,399 10/1979  Allen ................................... 428/336
4,307,156 12/1981  Yanagisawa ........................ 428/623

Primary Examiner—Bernard D. Pianalto

[57] ABSTRACT

A nonbinder type of magnetic recording medium is disclosed. The binder is comprised of a non-magnetic support having thereon, in sequence, a thin magnetic metal film laminated using the evaporation technique and a protecting film, with the thin magnetic metal film converted in its surface part alone to a metal oxide layer by being oxidized with oxygen plasma, to a metal nitride layer by being nitrided with nitrogen plasma or to a glow discharge-processed layer. The protecting film includes a high molecular weight compound, a higher fatty acid, a fatty acid ester or a combination thereof, laminated on the metal oxide layer, the metal nitride layer or the glow discharge-processed layer.

4 Claims, 7 Drawing Figures

FIG.1
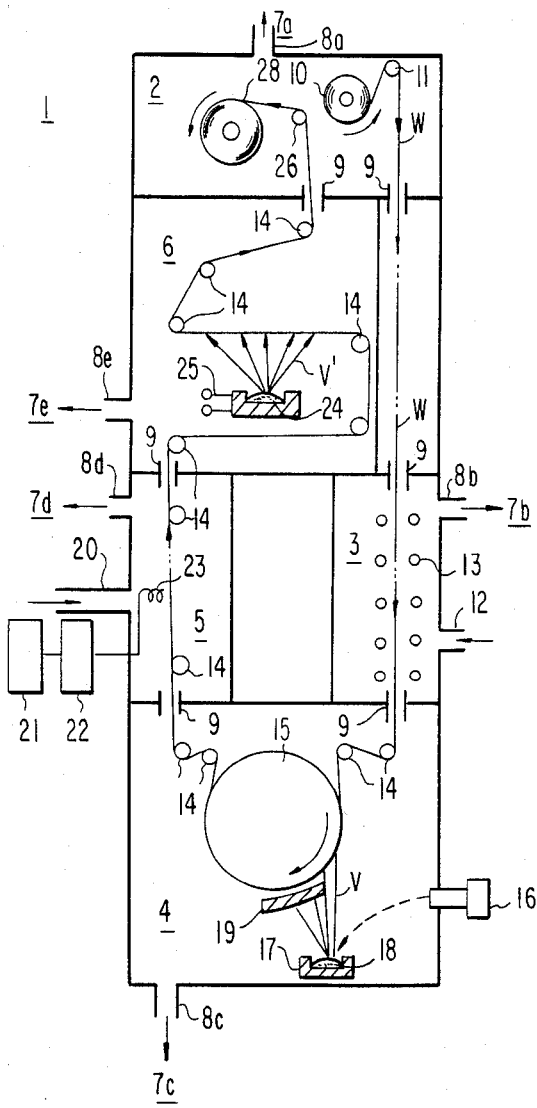
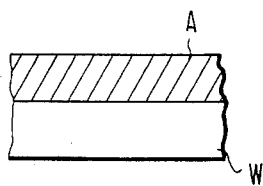
FIG.2
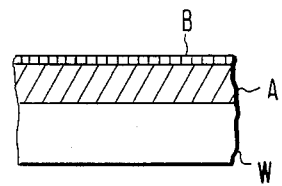
FIG.3
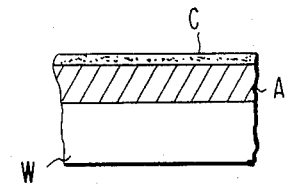
FIG.4
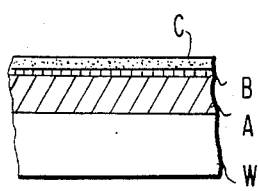
FIG.5
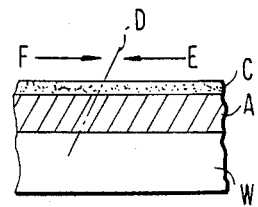
FIG.6
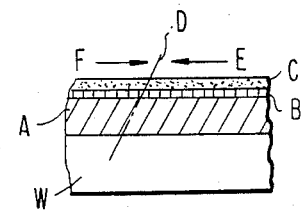
FIG.7

MAGNETIC RECORDING MEDIUM

FIELD OF THE INVENTION

The present invention relates to a magnetic recording medium having a magnetic recording layer in the form of a thin film of a ferromagnetic metal provided by an evaporation technique and, particularly, to a magnetic recording medium possessing excellent running characteristics, weather resistance and durability.

BACKGROUND OF THE INVENTION

Previously, coated type magnetic recording media have been prevailingly employed. Such media are produced by coating on a non-magnetic support a magnetic coating composition prepared by kneading and dispersing a powdery magnetic material. Examples of such materials include ferromagnetic oxide powders with specific examples including $\gamma$-$Fe_2O_3$, Co-doped $\gamma$-$Fe_2O_3$, $Fe_3O_4$, Co-doped $Fe_3O_4$, Berthollide compounds constituted with $\gamma$-$Fe_2O_3$ and $Fe_3O_4$, $CrO_2$ and the like, ferromagnetic alloy powders or so on. These materials are combined with organic binders such as vinyl chloride-vinyl acetate copolymers, styrene-butadiene copolymers, epoxy resins, polyurethane resins or so on in an organic solvent. The composition is then dried to form a magnetic layer. In recent years, the demand for high density recording has increased. Accordingly, the so-called nonbinder type magnetic recording media, which contain no binders in their magnetic recording layers, have attracted a great deal of attention. The magnetic recording layers of such media are comprised of thin films of ferromagnetic metals formed by the vapor deposition techniques such as vacuum evaporation, sputtering, ion plating or like techniques, or the metal plating techniques such as electroplating, nonelectrode plating or like techniques. Various efforts to make the use of such media practical have been made.

Conventional magnetic recording media have principally utilized as magnetic materials metal oxides having saturation magnetizations smaller than those of ferromagnetic metals. Therefore, the means for reducing the thicknesses of recording materials of the coating type for the purpose of heightening their recording densities have been limited because the reduction of the thickness is attended by the lowering of the signal output. In addition, these media are undesirable because they are manufactured by complicated processes and also because large-sized incidental equipments for recovering solvents used in the manufacturing process or for preventing environmental pollutions have been required. On the other hand, nonbinder type of magnetic recording media contain ferromagnetic metals, which have saturation magnetizations greater than those of the above-described metal oxides, in the form of thin film in which any non-magnetic substances such as binder are not incorporated. Therefore, such media are advantageous in that they make it possible to use very thin magnetic films for high density recording. Furthermore, manufacturing processes for producing them are simple.

A magnetic recording medium to be employed in high density recording must use a magnetic substance having high coercive force. From a theoretical and experimental point of view, a reduction in thickness has been proposed. Such being the case, great expectations are held for nonbinder type magnetic recording media because it is easy to decrease their thicknesses one order of magnitude below the realizable thicknesses of the coating type of magnetic recording media. Furthermore, they possess high magnetic flux densities.

In particular, using an evaporation technique to form a magnetic recording layer is advantageous with respect to the disposal of waste solutions. Furthermore, the manufacturing process is simple, and a deposition speed of a magnetic metal film is high.

Thin films constituted with ferromagnetic metals have problem with regard to lasting high corrosive strength, abrasive strength and running stability. The magnetic recording medium and a magnetic head are in high speed relative motion as they come into contact with each other throughout the magnetic signal recording, reproducing and erasing processes. In such processes, smooth and stable running of the magnetic recording medium must be ensured. At the same time, wear or rupture thereof must not be caused by the continual contact with a magnetic head. Moreover, it is preferred that there is little or no decrease or erasure of signals recorded in the magnetic recording medium with the lapse of time; for example, generation of stains upon storage. In order to improve durability and weather resistance, various kinds of protecting layers have been proposed. However, such protecting layers are restricted in their thicknesses because a magnetic head and a magnetic recording layer are separated by a protecting layer. Therefore, if the protecting layer is thick the spacing loss increases even more. Accordingly, it is necessary to impart durability and weather resistance to the magnetic recording layer itself.

The above-described protecting layer or protecting film was generally made up of, e.g., a hard metal such as rhodium, chromium or the like, a hard inorganic substance such as WC, $TiO_2$, $CaF_2$ or the like, a lubricant, or a high molecular weight compound.

Attempts to impart both satisfactory running and durability characteristics to magnetic recording media by providing protecting films have been unsuccessful. A main cause of the failure consists in the generation of scratches on the surface of a magnetic recording medium. The scratches are caused by pieces of a hard metal or a hard inorganic substances from the protecting layer made up of such a hard material. The material breaks away due to weakness of binding at the interface of a thin magnetic metal film and a protecting film with a protecting film made up of a polymer or a lubricant. These factors caused a deterioration of the running characteristics and abrasion resistivity characteristics. These problems increased with the lapse of time to a considerable degree.

Japanese Patent Application (OPI) No. 33806/75 (the term "OPI" as used herein refers to a "published unexamined Japanese patent application") discloses a method of nitriding a magnetic layer in the neighborhood of its surface by direct current glow discharge of nitrogen gas. However, the running characteristics can not be improved by merely nitriding the surface of a magnetic layer. Furthermore, in order to create a protecting effect by converting the surface part of a magnetic layer into the nitride layer, it is necessary for the resulting metal nitride layer to have a considerable thickness. Therefore, the glow discharge processing must be continued for a long time ranging from 10 minutes to 2 hours.

Various processes are known for forming a protecting layer by oxidizing the surface of a magnetic layer. Examples of these processes include a process of oxidizing the surface of a ferromagnetic metal thin film under high temperature and high humidity. This is disclosed in Japanese Patent Publication No. 20225/73. Another process includes the steps of, in sequence, allowing a magnetic alloy thin film to come into contact with nitric acid, applying heat thereto to form the oxide layer in the surface part of the film and allowing a lubricant to permeate into the oxide layer, as disclosed in British Pat. No. 1,265,175. Another process involves forming an oxide layer by treating the surface of a magnetic alloy thin film with an aqueous solution of an inorganic oxidizing agent and an organic chelating agent and then subjecting the resulting surface to a heat treatment in the atmosphere of oxygen. However, these oxidizing processes are not desirable because it is difficult to form a uniform thin oxide layer. Furthermore, the vacuum condition must be broken after the formation of the thin film of a magnetic metal because aqueous solutions and the like are used in these processes. In addition, it is not possible to carry out these processes continuously. Therefore, it takes a long time to finish the above-described steps and further the control of processing conditions is complicated.

SUMMARY OF THE INVENTION

An object of the present invention is to provide a nonbinder type of magnetic recording medium free from the defects of conventional magnetic recording media and, consequently, has excellent durability, running property and weather resistance.

Another object of the present invention is to provide a process for manufacturing a nonbinder type of magnetic recording medium which has excellent durability, running property and weather resistance.

One of the above-described objects is attained by a magnetic recording medium, which comprises a non-magnetic support having thereon, in sequence, a thin magnetic metal film laminated using an evaporation technique and a protecting film. The surface portion only of such a thin magnetic metal film is converted to a metal oxide layer, to a metal nitride layer, or to a glow discharge-processed layer. The protecting film includes a high molecular weight compound, with a higher fatty acid, with a fatty acid ester, or with a combination thereof. The film is laminated on the metal oxide layer, on the metal nitride layer, or on the glow discharge-processed layer. Another object is achieved by a process for manufacturing a magnetic recording medium which includes the steps of, in sequence: (1) evaporating a thin film of a magnetic metal onto a non-magnetic support; (2) converting the surface part of the thin film to the layer of the oxide or the nitride of the magnetic metal or to the glow discharge-processed layer by subjecting the surface of the thin film to an oxidizing processing with oxygen plasma generated by high voltage application, to a nitriding processing with nitrogen plasma generated by high voltage application, or to a glow discharge processing, respectively; and (3) forming, under a succeeded vacuum condition, on the thus-processed surface a protecting film of a high molecular weight compound, a higher fatty acid, a fatty acid ester or a combination thereof.

BRIEF DESCRIPTION OF THE DRAWINGS

FIG. 1 is a schematic sectional side view illustrating essential parts of an evaporation thin film manufacturing apparatus to be employed in the present invention.

FIGS. 2 to 7 are sectional rough sketches of magnetic recording media manufactured in accordance with preferred embodiments of the present invention.

Therein, the numeral 2 designates a compartment used for sending out and winding up a support. The numeral 3 is a compartment for carrying out glow discharge processing. The numeral 4 is a compartment for evaporating a magnetic thin film, the numeral 5 a compartment for carrying out an oxidizing processing, and the numeral 6 a compartment for evaporating a protecting film. The character W is a support.

DETAILED DESCRIPTION OF THE INVENTION

The present invention is further illustrated hereinafter in greater detail with reference to the accompanying drawings.

As illustrated in FIG. 1, the evaporation thin film manufacturing apparatus 1 is employed for conducting the process of the present invention. The apparatus is comprised of a compartment 2 for sending out and winding up a support, a compartment 3 for carrying out a glow discharge processing, a compartment 4 for evaporating a magnetic thin film, a compartment 5 for carrying out oxidizing, a nitriding or a glow discharge processing and a compartment 6 for evaporating a protecting film. The compartments are each connected in turn with the succeeding compartment through a slit 9 having an opening which is so restricted on its area so as to permit only the passage of a support. In addition, the above-described compartments 2 to 6 are connected with their respective independent evacuating systems 7a to 7e through their respective conduit pipes 8a to 8e. Each compartment is designed so as to maintain an independent degree of vacuum (ranging usually from $10^{-2}$ to $10^{-6}$ Torr).

A roll 10 is placed in a compartment 2 for sending out and winding up a support. The roll 10 is comprised of a non-magnetic flexible belt-form support W supported by an axis so that it can revolve freely therearound in place alone side the pulling-out roller 11. The support W is payed out continuously from the roll 10 by driving the roller 11, and led into the compartment 3 for glow discharge processing. In compartment 3 Ar gas is supplied through the conduit pipe 12 generating glow discharge under a vacuum atmosphere of 0.1 to $2 \times 10^{-3}$ Torr by application of AC high voltage ranging from about 0.4 to about 5 KV to electrodes 13. Accordingly, the surface of the support W is cleaned and activated resulting in raising the affinity to a magnetic thin film to be evaporated thereonto in the subsequent step.

The support W which has passed through the compartment 3 for a glow discharge processing is led into the compartment 4. In the compartment 4 the running direction of the support is reversed through plural guide rollers 14 at the lower part of a cooling can 15. The can 15 is supported by an axis allowing it to freely revolve while traveling along the external circumference of the cooling can. Thereafter, the support is sent forth into the processing compartment 5.

The compartment 4 is kept under relatively high vacuum (e.g., $10^{-5}$ Torr). An evaporation source of a magnetic substance 18 (e.g., a cobalt material, a nickel material, an iron material or so on) is placed in a hearth 17 and is heated and evaporated using an electron beam type of heating means 16 constructed by an electronic gun and an electric source. Thereupon, the thus-generated vapor flow V of the magnetic substance is usually controlled so as to reach onto the support 9 carried on the cooling can 15 with an incidental angle of about 45° to 90°. Thus, a thin evaporation film of magnetic metal (corresponding to A in FIG. 2) is formed on the support.

The hearth 17 and a mask 19 are properly arranged so that the incidental angle of the vapor flow V flows to the intended value.

To the processing compartment 5, oxygen gas in the case of the oxidizing processing, nitrogen gas in the case of the nitriding processing, or argon gas in the case of the flow discharge processing is supplied through the conduit 20 in an amount of 5 to about 50 cc/min under a vacuum degree of about 0.1 to about $2 \times 10^{-3}$ Torr. In the most preferred embodiments, the oxygen gas, the nitrogen gas or the argon gas can be supplied in an amount of about 8 cc/min under a vacuum degree of about $7 \times 10^{-2}$ Torr, in an amount of about 10 cc/min under a vacuum degree of about $1 \times 10^{-2}$ Torr, or in an amount of about 10 cc/min under a vacuum degree of about $1 \times 10^{-2}$ Torr, respectively.

Therein, oxygen, nitrogen or argon plasma is generated by applying a high frequency electric power (e.g., 13.56 MHz, 30 to 600 Watt) to a coil 23 through a matching box 22 from a high frequency electric source 21. The coil 23 is arranged in the neighborhood of the support W.

The support W sent forth into the processing compartment 5 is transported as it is exposed to oxygen, nitrogen or argon plasma and therethrough, the surface of the evaporation thin film of the magnetic metal is oxidized, nitrided or etched, respectively. Thus, the metal oxide layer, the metal nitride layer or the glow discharge processed layer (corresponding to B in FIG. 3) is formed.

Next, in the compartment 6, in order to prevent film evaporation, a high molecular weight compound, a higher fatty acid, a fatty acid ester or a combination thereof is employed as an evaporation source 24. The combination is heated and evaporated using a resistance type of heating means 25. The thus-generated vapor flow V' is evaporated onto the travelling support W to form a protecting film of a desired thickness (corresponding to C in FIG. 5 and FIG. 4) on the metal oxide layer or the metal nitride layer (corresponding to B in FIG. 3) or on the glow discharge processed surface.

The support W is then again returned to the sending-out and winding-up compartment 2. The wrinkles of the support are then smoothened out using expander roller 27 and subsequently, the support is wound up in the form of roll 28 resulting in the completion of a series of thin film forming steps.

In another embodiment of the present invention, the above-described vapor flow V' may be shot out in an oblique direction to the surface of the support W running inside the protecting film evaporation compartment 6 using a means such as a cooling can in the similar manner to that in the magnetic thin film evaporation compartment 4.

Specific examples of magnetic metal materials which can be employed in the present invention include metals such as Fe, Co, Ni and the like, and ferromagnetic alloys such as Fe-Co, Fe-Ni, Co-Ni, Fe-Co-Ni, Fe-Rh, Fe-Cu, Co-Cu, Co-Au, Co-Y, Co-La, Co-Pr, Co-Gd, Co-Sm, Co-Pt, Ni-Cu, Mn-Bi, Mn-Al, Fe-Cr, Co-Cr, Ni-Cr, Fe-Co-Cr, Ni-Co-Cr, Fe-Co-Ni-Cr and the like. Particularly preferable magnetic metal materials are Co and alloys having cobalt contents of 75% by weight.

The total thickness of the laminated magnetic thin films must be thick enough to provide sufficiently high output as a magnetic recording medium. Furthermore, they must be thin enough to effect high density recording. Therefore, the thickness generally ranges from 200 Å to 20,000 Å and preferably from 500 Å to 10,000 Å. A thickness of each magnetic thin film may be designed the same as that of another magnetic thin film, or ±50% of a thickness of the magnetic thin film disposed nearest to the support.

Evaporation processes applicable to the present invention include not only the usual vacuum deposition process as described in U.S. Pat. No. 3,342,632 and so on, but also processes of forming thin films on support in an atmosphere of evaporated molecules having a mean free path elongated by ionizing or accelerating the vapor flow by application of an electric field or a magnetic field thereacross or by irradiation with electron beams. The latter processes include specifically an electric field evaporation process as disclosed by the present inventors in Japanese Patent Application (OPI) No. 149008/76 and German OLS No. 2,622,597; the ionizing evaporation processes as disclosed in Japanese Patent Publication Nos. 11525/68, 20484/71, 26579/72 and 45439/74, and Japanese Patent Application (OPI) Nos. 33890/74, 34483/74 and 54235/74; and further the sputtering process and the plasma polymerization process.

Supports which may be preferably employed include plastic bases such as polyethylene terephthalate, polyimide, polyamide, polyvinyl chloride, cellulose triacetate, polycarbonate, polyethylene naphthalate and the like. It is particularly preferable to use as a support flexible plastic bases as described above and that having surface coarseness (ra) of 0.012 μm in the present invention.

High molecular weight compounds which can be preferably employed for the protecting film of the present invention include polyolefins, vinyl resins, vinylidene resins, polyesters, polycarbonates, polyamides, polyacrylonitriles, polyurethanes, polyethers and cellulose resins.

Preferred examples of higher fatty acids which can be used for the protecting film of the present invention include lauric acid, myristic acid, palmitic acid, stearic acid, behenic acid, oleic acid, linolic acid, linolenic acid, arachidonic acid and the like.

Preferred examples of fatty acid esters which can be used for the protecting film of the present invention include methyl stearate, ethyl palmitate, stearic acid monoglyceride and the like.

It is feasible in the present invention to form the protecting film by evaporating successively thin films of two or more of the above-described materials utilizing juxtaposed plural cooling cans. A total thickness of the thus-formed protecting film, whether it has a monolayer structure or a multilayer structure, ranges from 20 Å to 500 Å and preferably from 20 Å to 300 Å.

The term oxidizing processing or nitriding processing in the present invention indicates that a part of the surface layer of a magnetic metal thin film is oxidized or nitrided by exposing the magnetic metal thin film to oxygen plasma or nitrogen plasma generated by high voltage application, respectively. Thereupon, it is desirable for the oxidized or the nitrided area to have a thickness of about 300 Å or less. In the case of the nitriding processing, partial oxidation may take place simultaneously with nitriding due to the presence of oxygen remaining in the vacuum apparatus. Such a case is also included in the term nitriding processing.

The term glow discharge processing in the present invention indicates that a magnetic metal layer is exposed to glow discharge generated by applying DC, AC or high frequency high voltage across a processing gas. Preferred examples of the processing gas include not only argon gas but also helium gas, air, tetrafluoromethane and the like.

In accordance with preferred embodiments of the present invention, hardening of the surface of a magnetic metal thin film is accelerated and enhanced by oxidizing or nitriding the magnetic metal thin film itself and at the same time, a surface smoothness of the magnetic metal thin film is changed by irradiation with plasma. Accordingly, the magnetic thin film acquires a greatly improved function with respect to retention of a protecting layer to be coated thereon. The adhesiveness of the magnetic layer to a protecting layer to be provided thereon is also greatly enhanced by the glow discharge processing of the magnetic layer since the surface of the magnetic layer is dry-etched by such processing. Therefore, the surface smoothness of the magnetic layer is lowered.

These effects contribute to the production of a recording medium having excellent running characteristics, durability and weather resistance characteristics. In addition, when the surface of the magnetic thin film is nitrided, the magnetic recording medium has an excellent rust resistant property.

The magnetic recording medium of the present invention has another remarkable effect in that it can acquire durability characteristics independent of the running direction unlike conventional magnetic recording media formed by vapor deposition (Sample b) in which protecting layers are provided merely on their magnetic layers. More specifically, the magnetic head runs in the direction E shown in FIG. 6 or 7. This direction corresponds to the direction of rubbing against the slant column structure of a magnetic thin evaporation film growing in the direction D shown in FIG. 6 or 7. Conventional magnetic recording media of the type which have protecting layers provided merely on their magnetic thin films formed by vapor deposition exhibit durabilities reduced by factors of about ⅓ to 1/10, compared with those which they exhibit when a magnetic head runs in the direction F shown in FIG. 6 or 7. This direction corresponds to a favorable direction for rubbing the above-described slant column structure. On the other hand, the magnetic recording media of the present invention have greatly improved upon durability characteristics irrespective of the running direction of a magnetic head.

Novel effects of the present invention will now be made clear by the following example.

EXAMPLE

An evaporation thin film manufacturing apparatus 1 as shown in FIG. 1 was used. A polyethylene terephthalate film support having a thickness of 25μ is arranged in the vacuum evaporation compartment so as to incline it at an angle of 60° to an evaporation source. Cobalt metal having a purity of 99.99% was evaporated with a speed of 2 Å/sec using an electron beam heating means under an atmosphere having a vacuum degree of $1 \times 10^{-5}$ Torr until the evaporation film having a thickness of 2,000 Å was formed on the above-described support. In the first case, the surface of the formed evaporation cobalt film was exposed to an atmosphere of oxygen plasma for about 1 minute. The plasma was generated under the conditions that a degree of vacuum was $7 \times 10^{-2}$ Torr, a high frequency output was 200 watt and the conducted amount of oxygen was 8 cc/min. (The recording medium manufactured through such a processing as described above was named Sample A.) In the second case, the surface of the evaporation cobalt film was exposed to an atmosphere of nitrogen plasma for about 1 minute. The plasma was generated under the same conditions as in the first case except that nitrogen was conducted in an amount of 10 cc/min instead of oxygen. (The recording medium manufactured through the above-described processing was named Sample B.) In the third case, the surface of the evaporation cobalt film was exposed to an atmosphere of argon plasma for about 1 minute. The plasma was generated under the same conditions as in the first case except that argon was conducted in an amount of 10 cc/min instead of the conduction of oxygen. (The recording medium manufactured through the above-described processing was named Sample C.) Onto each of the thus processed films were evaporated successively a polycarbonate film having a thickness of 80 Å and a behenic acid film having a thickness of 150 Å under atmospheres having vacuum degrees of $7 \times 10^{-4}$ Torr and $1 \times 10^{-4}$ Torr, respectively, with evaporation speeds controlled to 5 Å/sec and 20 Å/sec, respectively, using a resistance heating means.

All of the recording media produced in this manner exhibited excellent running property, weather resistance and still durability characteristics. As for the still durability characteristics, they were examined by measuring the time required for the signal output of a recording medium in a video tape recorder to be reduced to one-half its initial value by cessation of the tape running. Results of still durability characteristics measurements with respect to Samples A to C are shown in Table 1. For the purpose of comparison Table 1 is set forth below. The table compares the still durability characteristics of a recording medium (a) whose evaporation cobalt film is the same as those of Samples A to C but which did not receive any surface processings and which does not have any protecting layers, with a recording medium (b) which has the same evaporation cobalt film and the same protecting films as those of Samples A to C, but whose cobalt film did not receive any surface processings.

TABLE 1

| | Still Durability Characteristics | |
|---|---|---|
| | F Direction Running | E Direction Running |
| Sample (a) Co magnetic layer alone | 1 min. | 10 sec. |
| Sample (b) unprocessed + overcoat | 30 min. | 3 min. |
| Sample A processed with oxygen plasma + overcoat | 80 min. | 70 min. |

TABLE 1-continued

| | Still Durability Characteristics | |
|---|---|---|
| | F Direction Running | E Direction Running |
| Sample B processed with nitrogen plasma + overcoat | 90 min. | 70 min. |
| Sample C processed with argon glow + overcoat | 70 min. | 70 min. |

As can be seen from Table 1, Samples A to C manufactured in accordance with embodiments of the present invention exhibited markedly improved still durability characteristics unlike comparison samples (a) and (b).

It should be noted with respect to the processing of the surface of the evaporation cobalt film, that the oxygen plasma or the nitrogen plasma may be generated by application of DC voltage across an oxygen or a nitrogen atmosphere, respectively, and the flow discharge may be also generated by application of DC voltage.

While the invention has been described in detail and with reference to specific embodiments thereof, it will be apparent to one skilled in the art that various changes and modifications can be made therein without departing from the spirit and scope thereof.

What is claimed is:

1. A magnetic recording medium, comprising:
a non-magnetic support;
a thin film of a magnetic metal evaporated on the non-magnetic support, wherein the surface part of the film is converted to the metal oxide layer, wherein the total thickness of the thin film of magnetic metal ranges from about 200 Å to 20,000 Å, and the thickness of the metal oxide layer is less than 300 Å; and
a protecting film composed of a high molecular weight compound, a higher fatty acid, a fatty acid ester or a combination thereof, laminated on said metal oxide layer, wherein the thickness of the protecting film is less than 500 Å.

2. A magnetic recording medium, comprising:
a non-magnetic support;
a thin film of a magnetic metal evaporated on the non-magnetic support, wherein the surface part of the film is converted to a metal nitride layer, wherein the total thickness of the thin film of magnetic metal ranges from about 200 Å to 20,000 Å, and the thickness of the metal nitride layer is less than 300 Å; and
a protecting film composed of a high molecular weight compound, a higher fatty acid, and a fatty acid ester or a combination thereof, laminated on said nitride layer, wherein the thickness of the protecting film is less than 500 Å.

3. A magnetic recording medium, comprising a non-magnetic support;
a thin film of a magnetic layer evaporated on the non-magnetic support, wherein the surface part of the film is converted to glow discharge-process layer, wherein the thickness of the thin film of magnetic metal ranges from about 200 Å to 20,000 Å; and
a protecting film composed of a high molecular weight compound, a higher fatty acid, a fatty acid ester or a combination thereof, laminated on the glow discharge-process layer, wherein the thickness of the protecting film is less than 500 Å.

4. A magnetic recording medium as claimed in any of claims 1, 2 or 3, wherein said magnetic metal film has a thickness of from about 500 Å to about 10,000 Å.

* * * * *